US006984326B2

(12) United States Patent
Iseki et al.

(10) Patent No.: US 6,984,326 B2
(45) Date of Patent: Jan. 10, 2006

(54) NITROGEN TREATING METHOD AND NITROGEN TREATING SYSTEM

(75) Inventors: Masahiro Iseki, Ota (JP); Naoki Hiro, Osaka (JP); Tomohito Koizumi, Ota (JP); Tsuyoshi Rakuma, Ora-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 201 days.

(21) Appl. No.: 10/222,983

(22) Filed: Aug. 19, 2002

(65) Prior Publication Data

US 2003/0052062 A1 Mar. 20, 2003

(30) Foreign Application Priority Data

Sep. 19, 2001 (JP) ...................................... 2001-285568

(51) Int. Cl.
*C02F 1/46* (2006.01)

(52) U.S. Cl. ....................... 210/631; 210/748; 210/756; 210/757; 210/760; 210/192; 210/903; 205/746

(58) Field of Classification Search ................. 210/631, 210/748, 749, 756, 757, 758, 760, 765, 192, 210/198.1, 205, 903; 205/742, 746, 755, 205/756; 204/252, 282, 660
See application file for complete search history.

(56) References Cited

U.S. PATENT DOCUMENTS 3,719,570 A * 3/1973 Lancy ........................ 205/348
4,179,348 A * 12/1979 Bernat ........................ 588/247
4,956,057 A * 9/1990 Stucki et al. ............... 423/235
5,114,549 A * 5/1992 Shimamune et al. ....... 210/760
5,376,240 A * 12/1994 Kaczur et al. .............. 205/617
5,965,009 A * 10/1999 Shimamune et al. ....... 205/742
6,083,377 A * 7/2000 Lin et al. .................... 205/617
6,645,366 B2 * 11/2003 Iseki et al. .................. 205/742

FOREIGN PATENT DOCUMENTS

| | | | | |
|---|---|---|---|---|
| CN | 1049832 | A | | 3/1991 |
| DE | 3838181 | A1 | | 5/1990 |
| EP | 0412175 | A1 | | 2/1991 |
| GB | 2267290 | A | | 12/1993 |
| GB | 2332210 | A | | 6/1999 |
| JP | 7-299466 | | | 11/1995 |
| JP | 8-155461 | | | 6/1996 |
| JP | 8-155463 | | | 6/1996 |
| JP | 08-224598 | A | * | 9/1996 |
| JP | 10-000473 | | | 1/1998 |
| JP | 10-085752 | | | 4/1998 |
| JP | 10-230291 | A | * | 9/1998 |
| JP | 11-226576 | A | * | 8/1999 |
| JP | 11-267688 | A | * | 10/1999 |
| JP | 11-347558 | | | 12/1999 |
| JP | 2000-317494 | | | 11/2000 |
| WO | WO97/30941 | | | 8/1997 |

OTHER PUBLICATIONS

European Search Report dated Aug. 18, 2003.

* cited by examiner

*Primary Examiner*—Frank M. Lawrence
(74) *Attorney, Agent, or Firm*—Armstrong, Kratz, Quintos, Hanson & Brooks, LLP

(57) ABSTRACT

There are provided a nitrogen treating method and system for a nitrogen compound, which can treat the nitrogen compound efficiently and which can reduce the size and cost of an apparatus. The gist is that, in a nitrogen treating method wherein a nitrogen compound in for-treatment water is treated according to an electrochemical technique, a cathode reaction region and an anode reaction region are defined by a cation exchange membrane interposed between a cathode and an anode, and the for-treatment water treated in the cathode reaction region according to the electrochemical technique is treated with hypohalogenous acid, or, ozone or active oxygen according to a chemical technique.

8 Claims, 3 Drawing Sheets

NITROGEN TREATING METHOD AND NITROGEN TREATING SYSTEM

BACKGROUND OF THE INVENTION

The present invention relates to a nitrogen treating method and system for water to be treated, which contains organic nitrogen, nitrite nitrogen, nitrate nitrogen, nitric acid ion, or ammonia (hereinafter, "water to be treated" will be referred to as "for-treatment water").

It has been well known that the existence of nitrogen compounds is one of causes of eutrophication of rivers and lakes. The nitrogen compounds much exist in domestic life waste water or industrial waste water, but it is difficult to purify them and there are no effective countermeasures up to date. In general, a biological treatment has been implemented. However, the biological treatment comprises two processes, i.e. a nitrification process for converting ammonia nitrogen to nitrate nitrogen, and a denitrification process for converting nitrate nitrogen to nitrogen gas. Accordingly, there has been a problem that two different reaction vessels are required. There has been a further problem that because a time required for the treatment is extremely long, the treatment efficiency is extremely low.

Further, in this biological treatment, there has been another problem that a large-capacity anaerobic vessel is necessary for keeping denitrifying bacteria, thereby to induce the increase in equipment construction cost and apparatus installation area. There has been a further problem that the denitrifying bacteria are largely influenced by ambient temperature environment, components contained in the for-treatment water, and the like, and in particular, during the winter season when the temperature is low, their activities are lowered to deteriorate the denitrifying action, resulting in unstable processing efficiency.

Accordingly, there has been proposed a method for solving the foregoing technical problems, wherein a current is fed to the for-treatment water to dissolve ammonia, nitrite nitrogen or nitrate nitrogen through oxidation or reduction into nitrogen gas.

However, according to the conventional nitrogen compound treating method based on the electrolysis, there has been a problem that a reverse reaction occurs wherein ammonia is produced at the cathode side while nitric acid ion is produced at the anode side, resulting in lowering of the processing speed. Following this, there has been raised inconvenience due to lowering of the nitrogen removing efficiency.

SUMMARY OF THE INVENTION

Therefore, the present invention has been made for solving the conventional technical problems, and has an object to provide a nitrogen treating method and system for a nitrogen compound, which can treat the nitrogen compound efficiently and which can reduce the size and cost of an apparatus.

The nitrogen treating method of the present invention, wherein a nitrogen compound in for-treatment water is treated according to an electrochemical technique, is characterized in that a cathode reaction region and an anode reaction region are defined by a cation exchange membrane interposed between a cathode and an anode, and the for-treatment water treated in the cathode reaction region according to the electrochemical technique is treated with hypohalogenous acid, or, ozone or active oxygen according to a chemical technique.

According to the nitrogen treating method of the present invention, the nitrogen compound in for-treatment water is treated according to the electrochemical technique, the cathode reaction region and the anode-reaction region are defined by the cation exchange membrane interposed between the cathode and the anode, and the for-treatment water treated in the cathode reaction region according to the electrochemical technique is treated with hypohalogenous acid, or, ozone or active oxygen according to the chemical technique. Therefore, because a reverse reaction where nitric acid ion is produced at the anode side is suppressed, ammonia nitrogen can be produced from nitrate nitrogen contained in the for-treatment water with high efficiency in the cathode reaction region. Further, because ammonia nitrogen produced with high efficiency in the cathode reaction region produces an ammonia oxidation denitrifying reaction with hypohalogenous acid, or, ozone or active oxygen according to the chemical technique, nitrate nitrogen and ammonia nitrogen can be removed efficiently.

Further, as compared with the conventional case where the treatment of the nitrogen compound was carried out using the biological process vessel, because the nitrogen treatment can be achieved according to the electrochemical technique and the chemical technique, the nitrogen treating apparatus itself can be largely reduced in size and cost.

According to another aspect of the present invention, in addition to the foregoing, the nitrogen treating method is characterized in that a conductive material containing an element in the group IB or IIB of the periodic table, or a conductive material coated with the element is used as a metal material forming the cathode.

According to this aspect of the invention, in addition to the foregoing, the conductive material containing the element in the group IB or IIB of the periodic table, or the conductive material coated with the element is used as the metal material forming the cathode. Therefore, a reduction reaction of nitrate nitrogen to nitrite nitrogen and ammonia can be facilitated, so that a time required for the reduction reaction can be shortened and removal of low-concentrated nitrogen compounds can be achieved.

According to another aspect of the present invention, in addition to the foregoing, the nitrogen treating method is characterized in that the treatment according to the chemical technique is implemented by adding an agent containing hypohalogenous acid into the for-treatment water treated in the cathode reaction region according to the electrochemical technique.

According to this aspect of the invention, in addition to the foregoing, the treatment according to the chemical technique is implemented by adding the agent containing hypohalogenous acid into the for-treatment water treated in the cathode reaction region according to the electrochemical technique. Therefore, the denitrifying reaction of ammonia nitrogen in the for-treatment water with hypohalogenous acid can be performed with high efficiency, resulting in improvement in the treatment efficiency.

According to another aspect of the present invention, in addition to the foregoing, the nitrogen treating method is characterized in that the treatment according to the chemical technique is implemented by adding ozone gas produced in a discharging electricity manner into the for-treatment water treated in the cathode reaction region according to the electrochemical technique.

According to this aspect of the invention, in addition to the foregoing, the treatment according to the chemical technique is implemented by adding the ozone gas produced in the discharging electricity manner into the for-treatment water treated in the cathode reaction region according to the electrochemical technique. Therefore, the denitrifying reaction of ammonia nitrogen in the for-treatment water with ozone can be performed with high efficiency, resulting in improvement in the treatment efficiency.

According to another aspect of the present invention, in addition to the foregoing, the nitrogen treating method is characterized in that the treatment according to the chemical technique is implemented by mixing the for-treatment water treated in the cathode reaction region according to the electrochemical technique with for-treatment or treated water containing hypohalogenous acid, or, ozone or active oxygen produced in the anode reaction region.

According to this aspect of the invention, in addition to the foregoing, the treatment according to the chemical technique is implemented by mixing the for-treatment water treated in the cathode reaction region according to the electrochemical technique with the for-treatment or treated water containing hypohalogenous acid, or, ozone or active oxygen produced in the anode reaction region. Therefore, the for-treatment water containing ammonia and produced in the cathode reaction region can react with hypohalogenous acid which has already been produced in the anode reaction region, so that the denitrifying treatment can be performed efficiently.

According to another aspect of the present invention, in addition to the foregoing, the nitrogen treating method is characterized in that the treatment according to the electrochemical technique is implemented while agitating the for-treatment water in the cathode reaction region.

According to this aspect of the invention, in addition to the foregoing, the treatment according to the electrochemical technique is implemented while agitating the for-treatment water in the cathode reaction region. Therefore, the probability of contact of nitrate nitrogen contained in the for-treatment water in the cathode reaction region, particularly the negative-charged nitric acid ion, with the cathode is increased, resulting in further facilitating the production of ammonia from the nitric acid ion.

According to another aspect of the present invention, in addition to the foregoing, the nitrogen treating method is characterized in that the for-treatment water is water after subjected to a process in a biological process purifying vessel.

According to this aspect of the invention, in addition to the foregoing, the for-treatment water is water after subjected to the process in the biological process purifying vessel. Therefore, COD, BOD and the like are highly removed in the biological process purifying vessel such as an activated sludge process vessel, and further, bacteria generated in the activated sludge process vessel are sterilized by hypohalogenous acid or active oxygen, and then the treated water is discharged.

According to another aspect of the present invention, the nitrogen treating system is characterized in that a nitrogen treating apparatus for treating the nitrogen compound in the for-treatment water according to any one of the foregoing nitrogen treating methods is disposed at a stage subsequent to a biological process purifying vessel.

According to this aspect of the invention, the nitrogen treating apparatus for treating the nitrogen compound in the for-treatment water according to any one of the foregoing nitrogen treating methods is disposed at the stage subsequent to the biological process purifying vessel. Therefore, COD, BOD and the like are highly removed in the biological process purifying vessel such as an activated sludge process vessel, and further, bacteria generated in the activated sludge process vessel are sterilized by hypohalogenous acid or active oxygen, and then the treated water is discharged.

DETAILED DESCRIPTION OF THE PREFERRED EMBODIMENT

Figure 1:
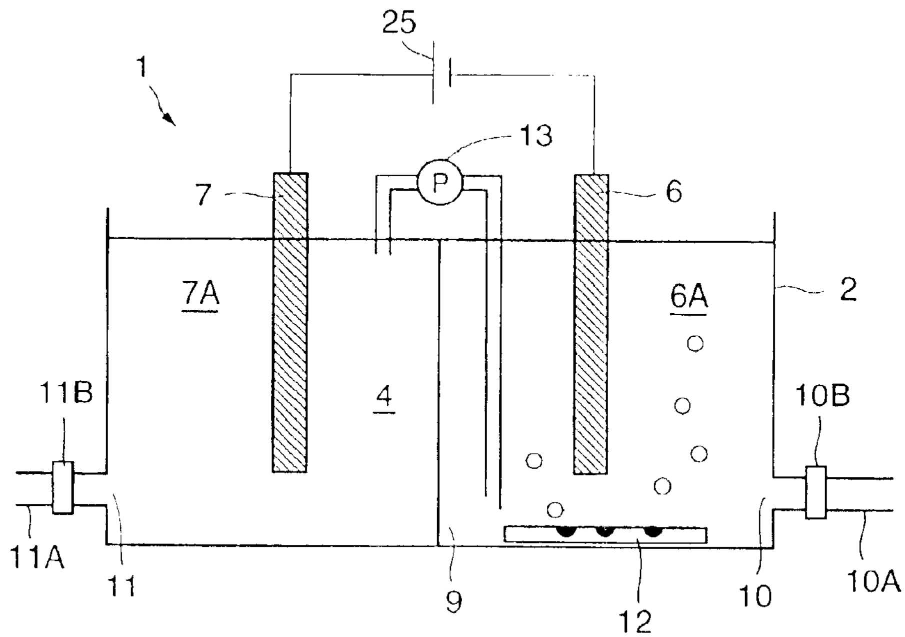
FIG. 1 is an explanatory diagram showing an outline of a nitrogen treating apparatus for implementing a nitrogen treating method of the present invention.

Now, preferred embodiments of the present invention will be described in detail with reference to the accompanying drawings. FIG. 1 is an explanatory diagram showing an outline of a nitrogen treating apparatus 1 for carrying out a nitrogen treating method of the present invention. In this embodiment, the nitrogen treating apparatus 1 performs a treatment of nitrogen compounds contained in, for example, domestic life waste water or industrial waste water, and comprises a treating vessel 2 having a treating chamber 4 therein.

The treating vessel 2 has, for example, a rectangular shape. In for-treatment water reserved in the treating chamber 4 of the treating vessel 2, a pair of electrodes, i.e. a cathode 6 and an anode 7, are disposed confronting each other, with at least portions thereof immersed in the for-treatment water. In this embodiment, the pair of electrodes are used. However, a plurality of electrodes more than the pair may also be used. A power supply 25 is provided for energizing the cathode 6 and the anode 7. The power supply 25 is controlled in an ON/OFF fashion by a controller (not shown).

In this embodiment, the cathode 6 is made of an alloy or sintered body of copper and zinc, of copper and iron, of copper and nickel, or of copper and aluminum, as a conductive material containing an element in the group IB or IIB of the periodic table, while the anode 7 is an insoluble electrode made of insoluble metal such as platinum, iridium, palladium or its oxide, or made of carbon.

In this embodiment, a cation exchange membrane 9 is provided between the cathode 6 and the anode 7 in the treating chamber 4 so as to partition the interior of the treating chamber 4 into a cathode reaction region 6A where the cathode 6 is disposed, and an anode reaction region 7A where the anode 7 is disposed.

At a lower part of a side wall, forming the cathode reaction region 6A, of the treating vessel 2, an inlet 10 is provided for introducing the for-treatment water such as the foregoing domestic life waste water or industrial waste water into the treating chamber 4. To the inlet 10 is connected a pipe 10A for guiding the for-treatment water to the treating vessel 2. The pipe 10A is provided with a control valve 10B for controlling the flow of the for-treatment water into the treating chamber 4.

On the other hand, at a lower part of a side wall forming the anode reaction region 7A, an outlet 11 is provided for discharging the treated water within the treating chamber 4 to the exterior. Like the foregoing, a pipe 11A is connected to the outlet 11 for discharging the treated water within the treating chamber 4 to the exterior, and is provided with a control valve 11B for controlling the flow of the treated water from the treating chamber 4.

In FIG. 1, numeral 12 denotes a bubble generator provided at a lower part of the cathode reaction region 6A as an agitation means for agitating the for-treatment water in the cathode reaction region 6A. The bubble generator 12 is controlled by the foregoing controller. In this embodiment, the bubble generator is used as the agitation means, but it may be replaced with a proper agitation member rather than the bubble generator.

Further, in FIG. 1, numeral 13 denotes an electric pump provided at a position above the treating vessel 2 as a for-treatment water conveying means for conveying the for-treatment water within the cathode reaction region 6A into the anode reaction region 7A. The electric pump 13 is controlled by the foregoing controller.

With the arrangement described above, the foregoing controller opens the control valve 10B and closes the control valve 11B, thereby to reserve for-treatment water containing nitrate nitrogen as a nitrogen compound, in the cathode reaction region 6A of the treating chamber 4. In this event, it is assumed that, as a liquid for allowing energization of the anode 7, the same for-treatment water or the tap water, for example, is reserved in the anode reaction region 7A.

Then, when the for-treatment water introduced in the cathode reaction region 6A has reached a predetermined water level, the controller closes the control valve 10B and turns on the power supply 25 to energize the cathode 6 and the anode 7. As a result, in the cathode reaction region 6A, nitric acid ion containing nitrate nitrogen contained in the for-treatment water is subjected to a reduction reaction due to electrolysis as an electrochemical technique, thereby to be converted to nitrous acid similarly containing nitrate nitrogen (reaction A). Then, nitrous acid produced through the reduction reaction of nitric acid ion is further subjected to a reduction reaction, thereby to be converted to ammonia containing ammonia nitrogen (reaction B). The reactions A and B are shown below.

$$NO_3^-+H_2O+2e^-\rightarrow NO_2^-+2OH^- \quad \text{Reaction A}$$

$$NO_2^-+5H_2O+6e^-\rightarrow NH_3(aq)+7OH^- \quad \text{Reaction B}$$

In this embodiment, the cathode 6 is made of an alloy or sintered body of copper and zinc, of copper and iron, of copper and nickel, or of copper and aluminum, as a conductive material containing an element in the group IB or IIB of the periodic table. Therefore, the reduction reaction of nitrate nitrogen in the for-treatment water to form nitrite nitrogen and ammonia can be facilitated, so that a time required for the reduction reaction can be shortened and removal of low-concentrated nitrogen compounds can be achieved.

In this event, because the cathode reaction region 6A and the anode reaction region 7A are partitioned by the cation exchange membrane 9, it can be prevented that negative-charged nitric acid ion existing in the cathode reaction region 6A is attracted to the anode 7 and thus the nitric acid ion does not move toward the cathode 6, thereby to extremely lower the efficiency of the reduction reaction of the nitric acid ion. Accordingly, ammonia can be produced from the nitric acid ion with high efficiency.

While energizing the cathode 6 and the anode 7, the controller operates the bubble generator 12 as the agitation means to agitate the for-treatment water in the cathode reaction region 6A. With this agitation, nitrate nitrogen contained in the for-treatment water in the cathode reaction region 6A, particularly the negative-charged nitric acid ion, is positively brought into contact with the cathode 6, so that, as compared with the case of performing no agitation, the probability of contact of the nitric acid ion with the cathode 6 is improved, resulting in facilitating the production of ammonia from the nitric acid ion.

Upon energization of the cathode 6 and the anode 7, the reaction of converting nitric acid ion to ammonia is generated due to the cathode 6 in the cathode reaction region 6A as described above, while, in the anode reaction region 7A, hypochlorous acid as an example of hypohalogenous acid, or, ozone or active oxygen is produced from the surface of the anode 7. Therefore, hypochlorous acid, or, ozone or active oxygen is present in the for-treatment water or the tap water existing in the anode reaction region 7A.

It may be arranged that a means for adjusting the concentration of chloride ion (one example of halide ion) in the for-treatment water reserved in the anode reaction region 7A is provided in the anode reaction region 7A, thereby to adjust the for-treatment water to a predetermined chloride ion concentration. With this arrangement, since the chloride ion concentration in the anode reaction region 7A is increased, the efficiency of production of hypochlorous acid is improved.

The controller energizes the cathode 6 and the anode 7 for more than a predetermined time and, after nearly all nitrate nitrogen existing in the cathode reaction region 6A has been converted to ammonia nitrogen, it stops energization of the cathode 6 and the anode 7 while conveys the for-treatment water in the cathode reaction region 6A into the anode reaction region 7A by means of the electric pump 13. In this event, if the for-treatment water or the tap water in the anode reaction region 7A reaches a predetermined or higher water level, the controller opens the control valve 11B to discharge a portion of the for-treatment water or the tap water from the anode reaction region 7A. At this time, the for-treatment water or the tap water should remain at a predetermined or higher water level in the anode reaction region 7A.

The for-treatment water containing ammonia (ammonia nitrogen) conveyed from the cathode reaction region 6A into the anode reaction region 7A as described above is mixed therein with the for-treatment water or the tap water containing hypochlorous acid, or, ozone or active oxygen, which has been reserved or remaining in the anode reaction region 7A. As a result, ammonia produced in the foregoing manner produces chemically (according to a chemical technique) an ammonia oxidation denitrifying reaction with hypochlorous acid, or, ozone or active oxygen produced in the foregoing manner, thereby to produce nitrogen gas (reaction C). Reactions C to F are shown below.

$$2NH_3(aq)+3(O)\rightarrow N_2\uparrow+3H_2O \quad \text{Reaction C}$$

$$NaCl\rightarrow Na^++Cl^- \quad \text{Reaction D}$$

$$2Cl^-\rightarrow Cl_2+2e^-$$

$$Cl_2+H_2O\rightarrow HClO+HCl \quad \text{Reaction E}$$

$$2NH_3+3HClO\rightarrow N_2\uparrow+3HCl+3H_2O \quad \text{Reaction F}$$

Accordingly, ammonia nitrogen produced with high efficiency in the cathode reaction region 6A can produce an ammonia oxidation denitrifying reaction with hypochlorous acid, or, ozone or active oxygen based on a chemical reaction as a normal chemical technique without implementing electrolysis, so that removal of nitrate nitrogen and ammonia nitrogen can be performed efficiently.

Further, in this embodiment, the for-treatment water containing ammonia subjected to the electrolytic treatment in the cathode reaction region 6A is mixed with the for-treatment water in the anode reaction region 7A containing hypochlorous acid, or, ozone or active oxygen produced in the anode reaction region 7A. Therefore, the for-treatment water containing ammonia and produced in the cathode reaction region 6A can react with hypochlorous acid, or, ozone or active oxygen which has already been produced in the anode reaction region 7A, so that the denitrifying treatment can be performed efficiently.

As described above, after the ammonia denitrifying treatment has been implemented in the anode reaction region 7A, the controller opens the control valve 11B so that a portion of the treated water is discharged to the exterior. Also in this event, the treated water should remain at the predetermined or higher water level in the anode reaction region 7A.

Thereafter, the controller opens the control valve 10B while closes the control valve 11B, thereby to reserve new for-treatment water in the cathode reaction region 6A. When the for-treatment water introduced in the cathode reaction region 6A has reached the predetermined water level, the controller closes the control valve 10B and turns on the power supply 25 to energize the cathode 6 and the anode 7. As a result, in the cathode reaction region 6A, nitrate nitrogen is converted to ammonia nitrogen like in the foregoing.

At this time, because a portion of the treated water subjected to the last ammonia denitrifying treatment remains in the anode reaction region 7A as described above, when the cathode 6 and the anode 7 are energized, hypochlorous acid, or, ozone or active oxygen is produced from the surface of the anode 7 in the anode reaction region 7A, while nitric acid ion is converted to ammonia by the cathode 6 in the cathode reaction region 6A as described above. Thus, hypochlorous acid, or, ozone or active oxygen is newly produced in the treated water in the anode reaction region 7A.

Accordingly, while ammonia nitrogen is produced from nitrate nitrogen due to electrolysis in the cathode reaction region 6A, hypochlorous acid, or, ozone or active oxygen for treating, in the form of a chemical reaction, ammonia nitrogen produced in the cathode reaction region 6A can be produced in the for-treatment or treated water in the anode reaction region 7A. Thus, the nitrogen treatment can be implemented efficiently.

Figure 2:
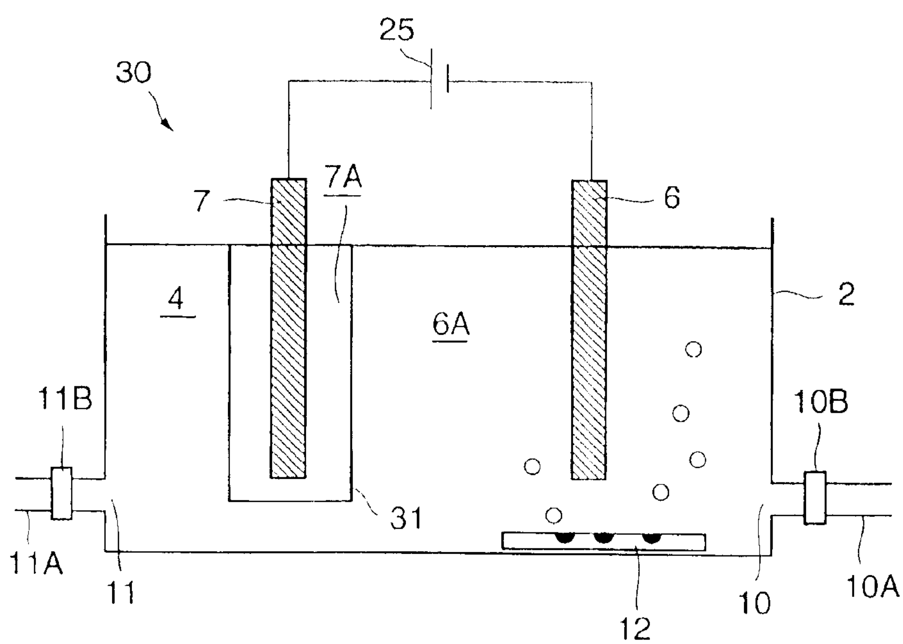
FIG. 2 is an explanatory diagram showing an outline of a nitrogen treating apparatus as another embodiment.

Now, a nitrogen treating method as another embodiment of the present invention will be described with reference to FIG. 2. FIG. 2 is an explanatory diagram showing an outline of a nitrogen treating apparatus 30 as another embodiment. In the figure, what are indicated by the same reference symbols as those in FIG. 1 exhibit the same or similar functions. In this embodiment, as shown in FIG. 2, instead of the foregoing cation exchange membrane 9, a cation exchange membrane 31 having a cylindrical shape with a bottom, i.e. a bottomed cylindrical shape, is provided between the cathode 6 and the anode 7 so as to enclose the anode 7. In this embodiment, the anode reaction region 7A represents a region around the anode 7 enclosed by the cation exchange membrane 31, while the cathode reaction region 6A represents a region other than the anode reaction region 7A in the treating chamber 4. Further, in this embodiment, the electric pump provided in the foregoing embodiment is not provided.

In this embodiment, the controller opens the control valve 10B to introduce for-treatment water containing nitrate nitrogen as a nitrogen compound into the cathode reaction region 6A of the treating chamber 4. In this event, it is assumed that, as a liquid for allowing energization of the anode 7, the same for-treatment water or the tap water, for example, is reserved in the anode reaction region 7A.

Then, when the for-treatment water introduced in the cathode reaction region 6A has reached a predetermined water level, the controller closes the control valve 10B and turns on the power supply 25 to energize the cathode 6 and the anode 7. As a results in the cathode reaction region 6A, nitric acid ion containing nitrate nitrogen contained in the for-treatment water is subjected to a reduction reaction due to electrolysis as an electrochemical technique, thereby to be converted to nitrous acid similarly containing nitrate nitrogen (reaction A). Then, nitrous acid produced through the reduction reaction of nitric acid ion is further subjected to a reduction reaction, thereby to be converted to ammonia containing ammonia nitrogen (reaction B). The reactions A and B are shown below.

$$NO_3^-+H_2O+2e^-\rightarrow NO_2^-+2OH^- \qquad \text{Reaction A}$$

$$NO_2^-+5H_2O+6e^-\rightarrow NH_3(aq)+7OH^- \qquad \text{Reaction B}$$

The controller energizes the cathode 6 and the anode 7 for more than a predetermined time and, after nearly all nitrate nitrogen existing in the cathode reaction region 6A has been converted to ammonia nitrogen, it stops energization of the cathode 6 and the anode 7 and adds an agent containing hypochlorous acid into the for-treatment water in the cathode reaction region 6A.

As a result, ammonia nitrogen produced in the for-treatment water in the cathode reaction region 6A causes a chemical reaction with the added agent so that nitrogen gas is produced from ammonia. Accordingly, the denitrifying reaction of ammonia nitrogen in the for-treatment water can be performed with high efficiency, resulting in improvement in the treatment efficiency.

Further, because removal of ammonia is achieved by the addition of the agent, the nitrogen treating apparatus can be simplified in structure and thus can be reduced in size.

On the other hand, instead of the foregoing agent containing hypochlorous acid, it may be arranged that ozone gas is produced by a separately provided discharge electricity-type ozone producing means, then the produced ozone gas is added into the for-treatment water in the cathode reaction region 6A.

With this arrangement, ammonia nitrogen produced in the for-treatment water in the cathode reaction region 6A causes a chemical reaction with the added ozone gas to produce nitrogen gas from ammonia. Accordingly, the denitrifying reaction of ammonia nitrogen in the for-treatment water can be performed with high efficiency, resulting in improvement in the treatment efficiency.

Figure 3:
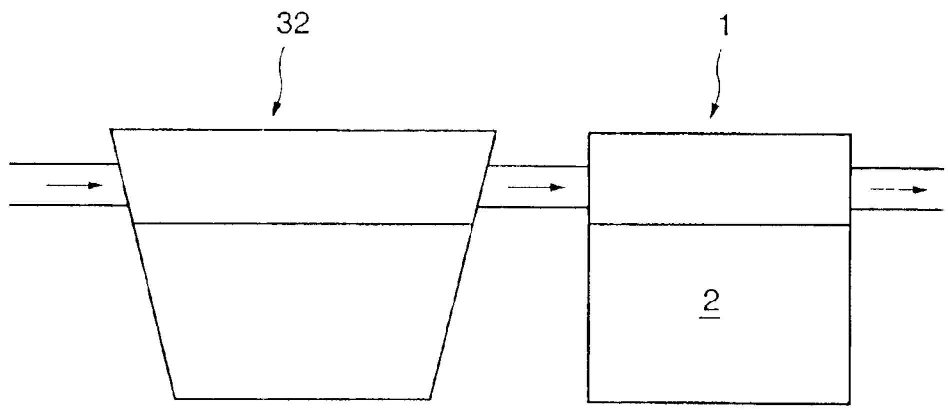
FIG. 3 is a diagram for explaining a first specific application example of the present invention.

In a first specific application example of the present invention, for-treatment water is reserved in a biological process purifying vessel, i.e. a so-called activated sludge process vessel 32 in this example as shown in FIG. 3, and, after COD and BOD are removed in the activated sludge process vessel 32, the for-treatment water subjected to the COD and BOD process is introduced into the treating vessel 2 of the nitrogen treating apparatus 1 or 30 applied with the present invention, wherein the nitrogen compound treatment is carried out.

With this arrangement, the for-treatment water is once subjected to the COD and BOD process in the activated sludge process vessel 32, then is further subjected to the nitrogen compound treatment in the nitrogen treating apparatus 1 or 30, so that the for-treatment water can be treated effectively. Further, although the for-treatment water processed in the activated sludge process vessel 32 includes bacteria generated in the activated sludge process vessel 32, sterilization is performed with hypochlorous acid, or, ozone or active oxygen in the nitrogen treating apparatus 1 or 30 as described above, so that the treated water is discharged in the state suitable for environment.

Figure 4:
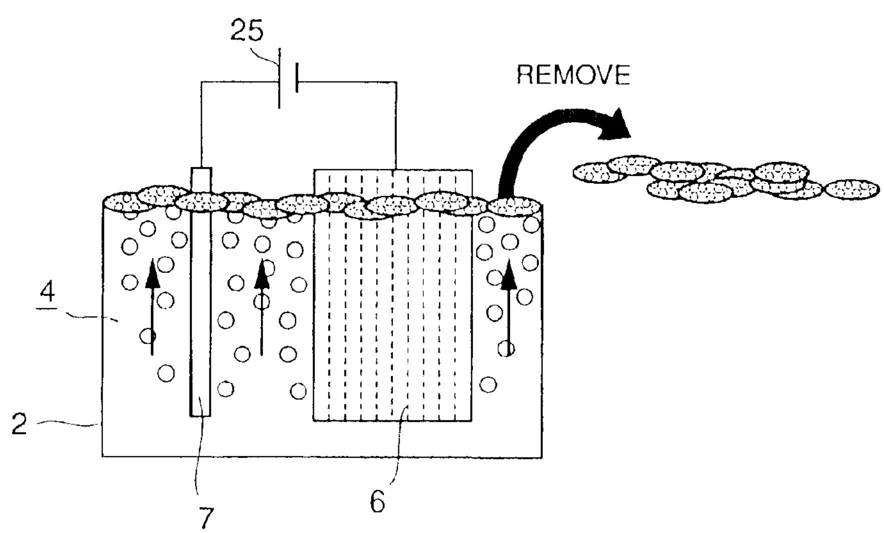
FIG. 4 is a diagram for explaining a second specific application example of the present invention.

In a second specific application example of the present invention, floating substances in the for-treatment water can be removed based on so-called electrolytic surfacing as shown in FIG. 4.

Figure 5:
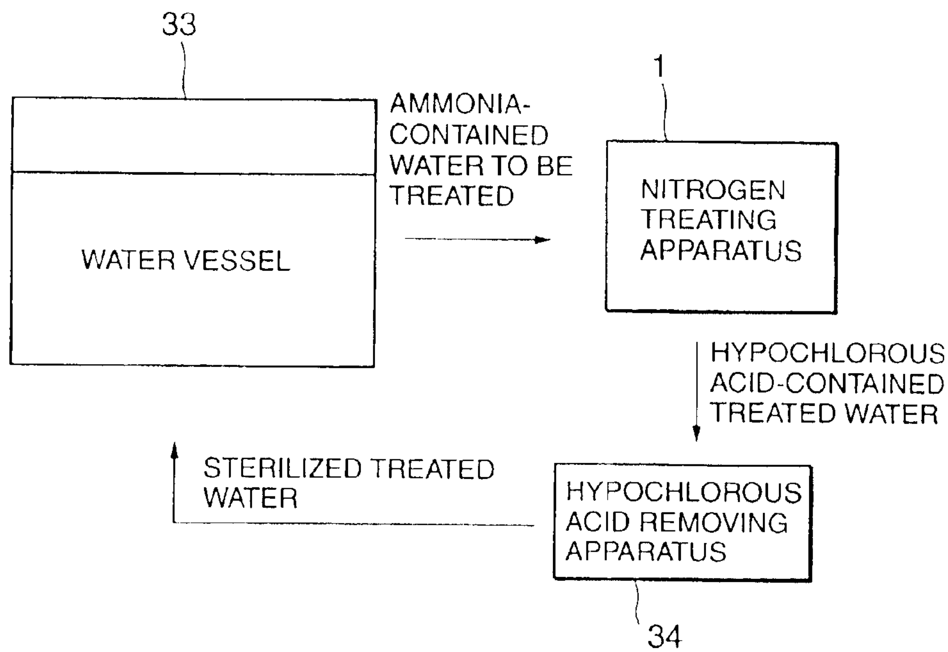
FIG. 5 is a diagram for explaining a third specific application example of the present invention.

In a third specific application example of the present invention, the nitrogen treating apparatus 1 or 30 can be used for removing nitrogen compounds contained in water reserved in a water vessel 33 where fishes live, in a fish preserve, an aquarium or the like, as shown in FIG. 5. Because the water in the water vessel where fishes live is extremely contaminated with nitrogen compounds such as ammonia discharged from the fishes, the water in the water vessel needs to be exchanged regularly. Therefore, the water in the water vessel 33 containing nitrogen compounds is subjected to the nitrogen compound treatment in the nitrogen treating apparatus 1 or 30, then the treated water discharged from the nitrogen treating apparatus 1 or 30 is introduced into a hypochlorous acid removing apparatus 34 where hypochlorous acid in the treated water is removed, and then the treated water is returned to the water vessel 33.

With this arrangement, it is not necessary to exchange the water in the water vessel 33 regularly, so that the maintenance operationality of the water vessel 33 can be improved. Further, because the treated water reserved in the nitrogen treating apparatus 1 or 30 is sterilized by hypochlorous acid, when such treated water is returned to the water vessel via the hypochlorous acid removing apparatus 34, the survival rate of fishes in the water vessel 33 can be improved.

Figure 6:
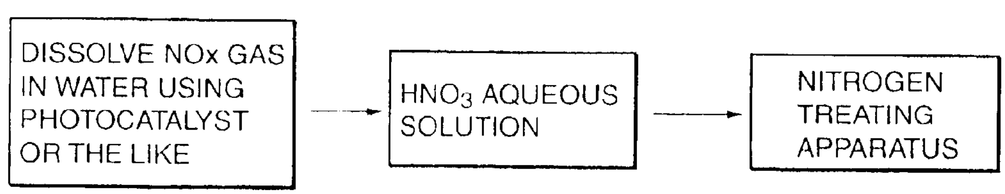
FIG. 6 is a diagram for explaining a fourth specific application example of the present invention.

In a fourth specific application example of the present invention, NOx gas in the air is dissolved in water using a photocatalyst or scrubber to form a nitric acid aqueous solution as shown in FIG. 6. Then, this nitric acid aqueous solution is introduced into the nitrogen treating apparatus 1 or 30 applied with the present invention, wherein nitrogen is removed. This can prevent such a situation that NOx gas is dissolved in water to form a nitric acid aqueous solution, then the nitric acid aqueous solution is drained into the soil to highly acidify the soil. Thus, the soil which has become acid can be kept neutral without using an agent.

The nitrogen treating method applied with the present invention can also be applied to, in addition to the foregoing, purification of for-treatment water in swimming pools or baths, or purification of well water or underground water, or the like.

In the foregoing embodiments, hypochlorous acid is used as an example of hypohalogenous acid. The present invention, however, is not limited thereto. Specifically, other halogen such as bromine or fluorine may be used. In this case, hypohalogenous acid in this invention represents hypobromous acid or hypofluorous acid.

As described above in detail, according to the nitrogen treating method of the present invention, the nitrogen compound in for-treatment water is treated according to the electrochemical technique, the cathode reaction region and the anode reaction region are defined by the cation exchange membrane interposed between the cathode and the anode, and the for-treatment water treated in the cathode reaction region according to the electrochemical technique is treated with hypohalogenous acid, or, ozone or active oxygen according to the chemical technique. Therefore, because a reverse reaction where nitric acid ion is produced at the anode side is suppressed, ammonia nitrogen can be produced from nitrate nitrogen contained in the for-treatment water with high efficiency in the cathode reaction region. Further, because ammonia nitrogen produced with high efficiency in the cathode reaction region produces an ammonia oxidation denitrifying reaction with hypohalogenous acid, or, ozone or active oxygen according to the chemical technique, nitrate nitrogen and ammonia nitrogen can be removed efficiently.

Further, as compared with the conventional case where the treatment of the nitrogen compound was carried out using the biological process vessel, because the nitrogen treatment can be achieved according to the electrochemical technique and the chemical technique, the nitrogen treating apparatus itself can be largely reduced in size and cost.

According to another aspect of the present invention, in addition to the foregoing, the conductive material containing the element in the group IB or IIB of the periodic table, or the conductive material coated with the element is used as the metal material forming the cathode. Therefore, a reduction reaction of nitrate nitrogen to nitrite nitrogen and ammonia can be facilitated, so that a time required for the reduction reaction can be shortened and removal of low-concentrated nitrogen compounds can be achieved.

According to another aspect of the present invention, in addition to the foregoing, the treatment according to the chemical technique is implemented by adding the agent containing hypohalogenous acid into the for-treatment water treated in the cathode reaction region according to the electrochemical technique. Therefore, the denitrifying reaction of ammonia nitrogen in the for-treatment water with hypohalogenous acid can be performed with high efficiency, resulting in improvement in the treatment efficiency.

According to another aspect of the present invention, in addition to the foregoing, the treatment according to the chemical technique is implemented by adding the ozone gas produced in the discharging electricity manner into the for-treatment water treated in the cathode reaction region according to the electrochemical technique. Therefore, the denitrifying reaction of ammonia nitrogen in the for-treatment water with ozone can be performed with high efficiency, resulting in improvement in the treatment efficiency.

According to another aspect of the present invention, in addition to the foregoing, the treatment according to the chemical technique is implemented by mixing the for-treatment water treated in the cathode reaction region according to the electrochemical technique with the for-treatment or treated water containing hypohalogenous acid, or, ozone or active oxygen produced in the anode reaction region. Therefore, the for-treatment water containing ammonia and produced in the cathode reaction region can react with hypohalogenous acid which has already been produced in the anode reaction region, so that the denitrifying treatment can be performed efficiently.

According to another aspect of the present invention, in addition to the foregoing, the treatment according to the electrochemical technique is implemented while agitating the for-treatment water in the cathode reaction region. Therefore, the probability of contact of nitrate nitrogen contained in the for-treatment water in the cathode reaction region, particularly the negative-charged nitric acid ion, with the cathode is increased, resulting in further facilitating the production of ammonia from the nitric acid ion.

According to another aspect of the present invention, in addition to the foregoing, the for-treatment water is water after subjected to the process in the biological process purifying vessel. Therefore, COD, BOD and the like are highly removed in the biological process purifying vessel such as an activated sludge process vessel, and further, bacteria generated in the activated sludge process vessel are sterilized by hypohalogenous acid or active oxygen, and then the treated water is discharged.

According to another aspect of the present invention, the nitrogen treating apparatus for treating the nitrogen compound in the for-treatment water according to any one of the foregoing nitrogen treating methods is disposed at the stage subsequent to the biological process purifying vessel. Therefore, COD, BOD and the like are highly removed in the biological process purifying vessel such as an activated sludge process vessel, and further, bacteria generated in the activated sludge process vessel are sterilized by hypohalogenous acid or active oxygen, and then the treated water is discharged.

What is claimed is:

1. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or ozone according to a chemical technique.

2. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or, ozone or active oxygen according to a chemical technique, wherein a conductive material containing an element in the group IB or IIB of the periodic table, or a conductive material coated with said element is used as a metal material forming said cathode.

3. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or, ozone or active oxygen according to a chemical technique, wherein the treatment according to said chemical technique is implemented by adding an agent containing hypohalogenous acid into the for-treatment water treated in said cathode reaction region according to said electrochemical technique.

4. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or, ozone or active oxygen according to a chemical technique, wherein the treatment according to said chemical technique is implemented by adding ozone gas produced in a discharging electricity manner into the for-treatment water treated in said cathode reaction region according to said electrochemical technique.

5. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or, ozone or active oxygen according to a chemical technique, wherein the treatment according to said chemical technique is implemented by mixing the for-treatment water treated in said cathode reaction region according to said electrochemical technique with for-treatment or treated water containing hypohalogenous acid, or, ozone or active oxygen produced in said anode reaction region.

6. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or, ozone or active oxygen according to a chemical technique, wherein the treatment according to said electrochemical technique is implemented while agitating the for-treatment water in said cathode reaction region.

7. A nitrogen treating method wherein a nitrogen compound in for-treatment water is treated according to an electrochemical technique, characterized in that:

a cathode reaction region and an anode reaction region are defined by a cation exchange membrane interposed between a cathode and an anode; and the for-treatment water treated in said cathode reaction region according to said electrochemical technique is treated with hypohalogenous acid, or, ozone or active oxygen according to a chemical technique, wherein the for-treatment water is water after subjected to a process in a biological process purifying vessel.

8. A nitrogen treating system, comprising:

a biological process purifying vessel;

an apparatus in which a cathode reaction region and an anode reaction region are defined by a cation exchange membrane interposed between a cathode and an anode, said apparatus being disposed at a stage subsequent to said biological process purifying vessel; and means for treatment of water in said cathode region with hypohalogenous acid or ozone according to a chemical technique.

* * * * *